United States Patent
Nakayama et al.

(10) Patent No.: US 7,084,902 B1
(45) Date of Patent: Aug. 1, 2006

(54) IMAGE DISPLAY DEVICE, DISPLAY METHOD AND DIGITAL CAMERA FOR REDUCING DISPLAY POWER CONSUMPTION

(75) Inventors: Takashi Nakayama, Asaka (JP); Kimiaki Nakada, Tokyo (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/447,430

(22) Filed: Nov. 23, 1999

(30) Foreign Application Priority Data

Nov. 27, 1998 (JP) ................................ 10-338000

(51) Int. Cl.
*H04N 5/225* (2006.01)
*H04N 5/222* (2006.01)
*H04N 3/14* (2006.01)

(52) U.S. Cl. ............... 348/207; 348/207.1; 348/333.13; 348/273

(58) Field of Classification Search ................ 348/207, 348/333.13, 207.1, 273
See application file for complete search history.

(56) References Cited

U.S. PATENT DOCUMENTS

| | | | | | |
|---|---|---|---|---|---|
| 5,748,237 A | * | 5/1998 | Ueda et al. | ............ | 348/333.08 |
| 5,844,540 A | * | 12/1998 | Terasaki | ............ | 345/102 |
| 5,872,515 A | * | 2/1999 | Ha et al. | ............ | 340/571 |
| 5,966,553 A | * | 10/1999 | Nishitani et al. | ........... | 396/303 |
| 6,085,048 A | * | 7/2000 | Mikoshiba et al. | ......... | 396/374 |
| 6,333,773 B1 | * | 12/2001 | Faris | ............ | 349/176 |
| 6,577,338 B1 | * | 6/2003 | Tanaka et al. | ........... | 348/207.2 |
| 6,677,936 B1 | * | 1/2004 | Jacobsen et al. | ............ | 345/211 |
| 2002/0008773 A1 | * | 1/2002 | Akizuki et al. | ............. | 348/371 |

FOREIGN PATENT DOCUMENTS

| | | |
|---|---|---|
| JP | 64-004181 | 1/1989 |
| JP | 03-177170 | 8/1991 |
| JP | 06-075669 | 3/1994 |
| JP | 07-294896 A | 11/1995 |
| JP | 08-076104 A | 3/1996 |
| JP | 10-096619 | * 4/1998 |
| JP | 10-098643 A | 4/1998 |
| JP | 10-142599 | 5/1998 |
| JP | 10-178566 A | 6/1998 |
| JP | 10-197865 | 7/1998 |
| JP | 10-234079 | 9/1998 |

* cited by examiner

*Primary Examiner*—David Ometz
*Assistant Examiner*—James M. Hannett
(74) *Attorney, Agent, or Firm*—Birch, Stewart, Kolasch & Birch, LLP

(57) ABSTRACT

When an image is played back on a liquid crystal cell, an auxiliary lamp is turned on. In this way, a displayed image can easily be confirmed. If an image frame forward switch is not turned on after the auxiliary lamp is turned on, the auxiliary lamp is turned off. In this way, unnecessary lighting of the auxiliary lamp can be prevented, and an amount of electric power consumed can be reduced.

22 Claims, 5 Drawing Sheets

IMAGE DISPLAY DEVICE, DISPLAY METHOD AND DIGITAL CAMERA FOR REDUCING DISPLAY POWER CONSUMPTION

BACKGROUND OF THE INVENTION

1. Field of the Invention

The present invention relates to an image display device, an image display method and a digital camera, and in particular, to an image display device and method in which an image is displayed on the basis of image data and then the image display device is switched so as to display another image, and to a digital camera equipped with such an image display device.

2. Description of the Related Art

Conventionally, liquid crystal display devices have been known as image display devices for displaying images on the basis of image data. There are the following two types of liquid crystal display devices. The first type of liquid crystal display device illuminates auxiliary light (so-called "backlight") from an auxiliary lamp onto a liquid crystal cell, so that an image can be confirmed by the light passing though the liquid crystal cell. The second type of liquid crystal display device does not include an auxiliary lamp. Light incident from the front surface of the liquid crystal cell passes (is transmitted) through the liquid crystal cell, is reflected off of a reflective film or the like provided at the rear surface of the liquid cell, and again passes through the liquid crystal cell, so that an image can be confirmed by the light passing through the liquid crystal cell. Or, the second type of liquid crystal display device may be structured such that exterior light is taken-in, and this intake light passes through the liquid crystal cell, so that an image can be confirmed by the light passing through the liquid crystal cell.

Because the second type of liquid crystal display device does not include an auxiliary lamp, little light passes through the liquid crystal cell, and it is difficult to confirm the image. In particular, when the amount of light which passes through the liquid crystal cell is extremely low, the image cannot be confirmed.

Thus, a third type of liquid crystal display device has been proposed which is structured such that a displayed image can be confirmed regardless of whether there is auxiliary light or not (see Japanese Patent Application Laid-Open (JP-A) Nos. 8-76104, 7-294896). This third type of liquid crystal display device combines the first type and the second type. Namely, in consideration of the fact that, in the second type of liquid crystal display device, it is difficult to confirm the image because the amount of light passing through the liquid crystal cell when there is no auxiliary light is low as described above, the third type of liquid crystal display device is structured such that exterior light incident from the front surface of the liquid crystal cell or the taken-in exterior light is supplemented by auxiliary light from an auxiliary lamp, so that the image can be confirmed.

However, in the third type of liquid crystal display device, because the auxiliary lamp is always lit when an image is confirmed, much electric power is used.

JP-A-10-98643 and JP-A-10-178566 each disclose a video camera having a function of displaying an image on a liquid crystal display device. These video cameras are provided with a power saving mode. In this power saving mode, image display on the liquid crystal display device is stopped (the backlight is turned off) in an attempt to cut down on the amount of power used.

However, in the above-described third type of liquid crystal display device, when the auxiliary lamp is turned off, there is little exterior light incident from the front surface of the liquid crystal cell or little intake exterior light, and thus, it is difficult to confirm the image.

SUMMARY OF THE INVENTION

In view of the aforementioned, an object of the present invention is to provide an image display device and method in which little electric power is used and in which an image can easily be confirmed, and to provide a digital camera equipped with the image display device.

In order to achieve the above object, the display device relating to the first aspect of the present invention displays an image on the basis of image data and switches from display of one image to display of another, and is structured such that an image displayed thereon can be confirmed regardless of the existence of auxiliary light. The auxiliary lamp illuminates auxiliary light to the display device. In other words, if there is auxiliary light from the auxiliary lamp, the image displayed on the display device can be confirmed easily. The display device relating to the present invention is structured such that, even if there is no light from the auxiliary lamp, the displayed image can be confirmed. Namely, the display device relating to the present invention allows the image to be confirmed by light incident from the front surface of the display device passing through the interior thereof and being reflected at a reflecting film or the like provided at the reverse surface of the display device and passing through the interior thereof, or by exterior light being taken in and the taken-in light (intake light) passing through the interior of the display device.

The image display device of the present invention is provided with a designating device for designating switching of an image. In a case in which the designating device designates switching of an image, a control device controls the display device such that the image is switched, and turns on the auxiliary lamp. Further, in a case in which the designating device designates switching of an image, the control device may light the auxiliary lamp when it becomes possible to display the image to be switched to on the display device. Namely, when switching of the image is designated, the auxiliary lamp may be turned off during the switching control of the display device.

Because the auxiliary lamp is turned on in this way, even in a case in which there is little exterior light, the image which is switched to can be easily confirmed. However, if the auxiliary lamp continues to be lit even after the image is confirmed, the auxiliary lamp will be lit unnecessarily.

Thus, the control device of the present invention turns off the auxiliary lamp in a case in which the designating device does not further designate switching of an image even after a predetermined amount of time has elapsed from the time an image was switched to or from the time the auxiliary lamp was lit.

In this way, if the designating device does not further designate switching of an image even after a predetermined amount of time has elapsed after an image was switched to and confirmed, the auxiliary lamp is turned off. Thus, the amount of electric power consumed can be reduced, and the image can be confirmed easily.

Here, as in the second aspect of the present invention, a setting means may further be provided in order to set the predetermined amount of time. Namely, a user may operate the setting means, and the predetermined amount of time may be set to a time in accordance with the user's operations. Further, as in the third aspect of the present invention, the predetermined amount of time may be set to zero.

The image display device of the present invention may be applied to various devices. As in the fourth aspect of the present invention, the image display device may be applied to a digital camera. Namely, in a digital camera having a photographing means for photographing a subject, and an image display device for displaying an image on the basis of image data obtained by photographing the subject by the photographing means, the image display device may be the image display device of any of the first through third aspects.

DESCRIPTION OF THE PREFERRED EMBODIMENTS

Embodiments of the present invention will be described in detail hereinafter with reference to the accompanying drawings.

Figure 1:
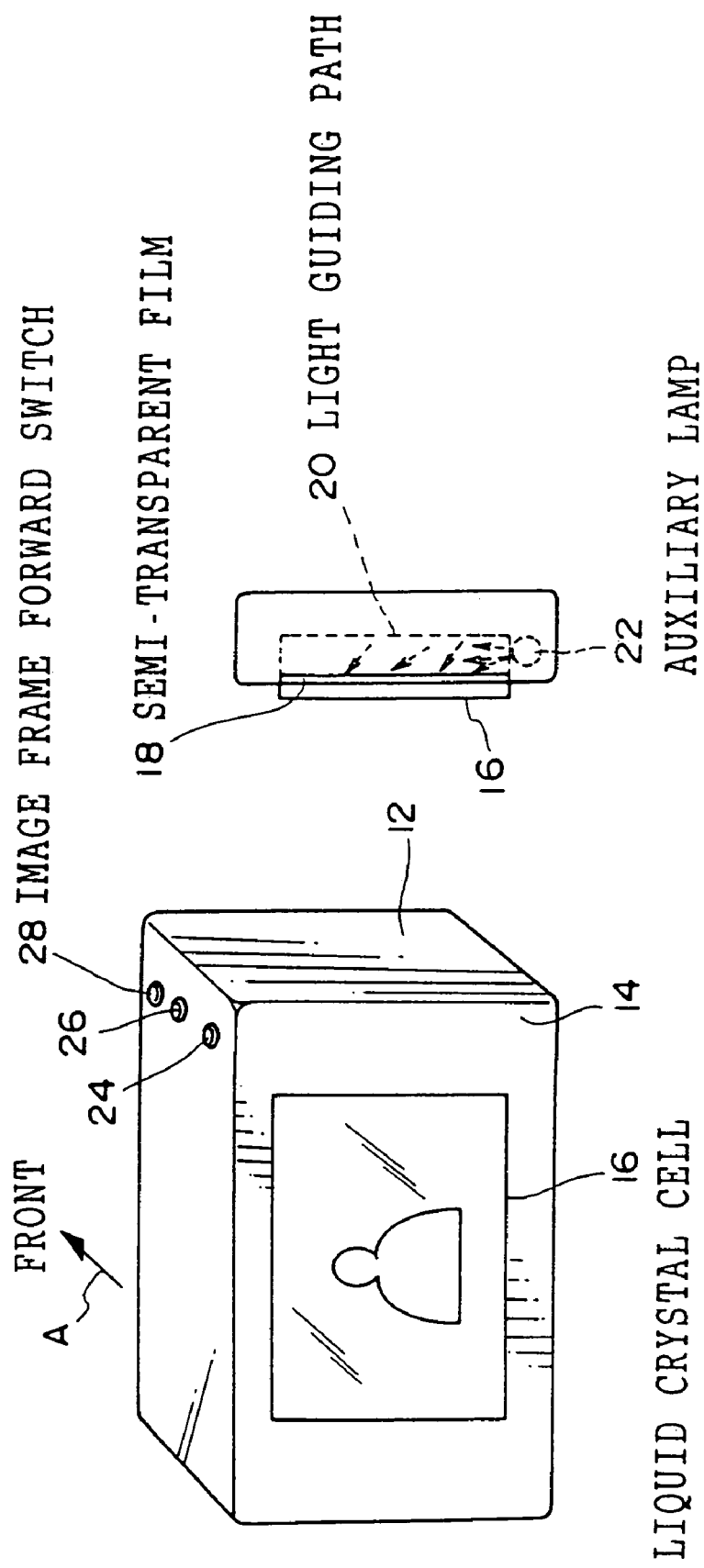
FIG. 1A is a rear perspective view of a digital camera equipped with an image display device relating to the present embodiment.
FIG. 1B is a cross-sectional view of the digital camera equipped with the image display device relating to the present embodiment.

As illustrated in FIG. 1, a digital camera equipped with an image display device relating to the present embodiment is equipped with a liquid crystal cell 16, which serves as the display device of the present invention, at a rear surface 14 side of a main body 12. A light guiding path 20, which guides light from an auxiliary lamp 22 to the liquid crystal cell 16, is provided at the reverse surface side (the side within the main body) of the liquid crystal cell 16. A semi-transparent film 18, which reflects a part (e.g., one-half) of the light incident from the front surface of the liquid crystal cell and allows part of the light (e.g., one-half) from the light guiding path 20 to pass through, is provided between the light guiding path 20 and the liquid crystal cell 16. The liquid crystal cell 16, the light guiding path 20, the semi-transparent film 18 and the like form the image display device of the present invention.

Due to the semi-transparent film 18, a part (e.g., one-half) of the light incident from the front surface of the liquid crystal cell is reflected, and a part (e.g., one-half) of the light from the light guiding path 20 passes through. Thus, the liquid crystal display device is structured such that the displayed image can be confirmed regardless of whether there is auxiliary light or not. Further, light from an auxiliary lamp 22 is illuminated onto the liquid crystal cell 16 in consideration of the fact that when there is no auxiliary light, the amount of light passing through the liquid crystal cell is low, and it is difficult to confirm the image.

The image display device relating to the present embodiment includes, on the top surface of the main body 12, a release switch 24, a mode switching switch 26, and an image frame forward switch 28. The release switch 24 provides the photographing timing. The mode switching switch 26 switches the mode of the digital camera between a photographing mode for photographing a subject, a playback mode for playing back a photographed image, and the like. The image frame forward switch 28, which serves as the designating device of the present invention, designates the switching of the played-back image.

Figure 2:
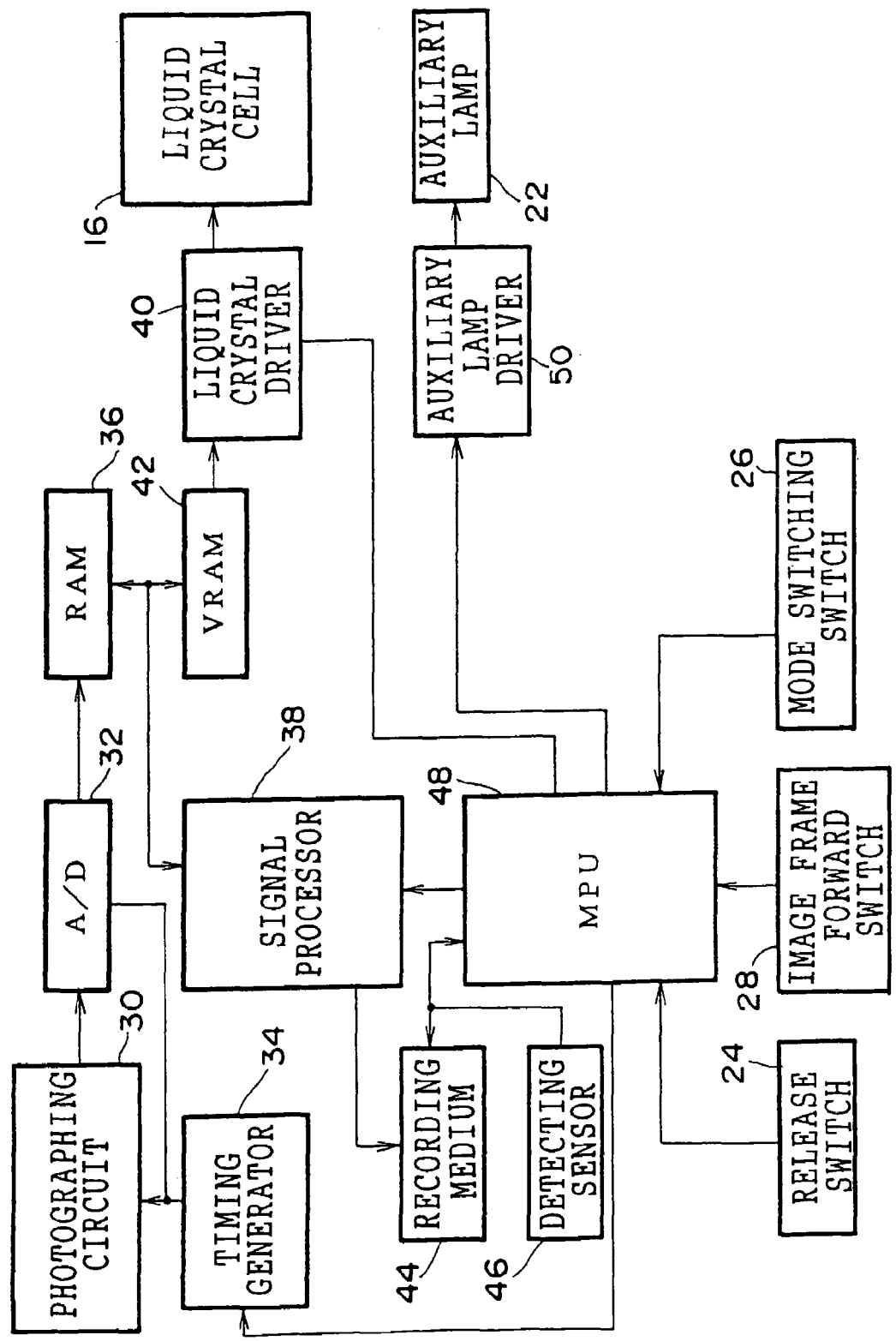
FIG. 2 is a block diagram of the digital camera relating to the present embodiment.

As illustrated in FIG. 2, the control system of the digital camera relating to the present embodiment includes a photographing circuit 30 which controls a photographing lens optical system (not shown) and the like; an analog/digital converter (A/D converter) 32 which converts into digital data the image signal obtained by photographing the subject by the photographing circuit 30; a timing generator 34 which provides various types of timings for the photographing circuit 30 and the A/D converter 32; a RAM 36 which temporarily stores the image data which has been subjected to A/D conversion; a signal processor 38 which carries out image processing; the liquid crystal cell 16 on which an image which is being photographed or has been photographed is displayed; a liquid crystal driver 40 which drives the liquid crystal cell 16; a VRAM 42 which stores image data of the image displayed on the liquid crystal cell 16; a storage medium 44 which stores image data in a compressed state; a detecting sensor 46 which senses loading of the storage medium 44; the auxiliary lamp 22 for providing auxiliary light to the liquid crystal cell 16; an auxiliary lamp driver 50 which turns the auxiliary lamp 22 on and off; and an MPU (microprocessor unit) 48 which controls the aforementioned elements. The release switch 24, the image frame forward switch 28 and the mode switching switch 26 are connected to the MPU 48.

Next, operation of the present embodiment will be described. First, processing of the MPU 48 in a case in which the mode of the digital camera has been switched to the photographing mode by the mode switching switch 26 will be described. On the basis of a signal from the detecting sensor 46, the loading of the storage medium 44 is sensed. Free space in the storage medium 44 is detected via the signal processor 38, and the number of images which can be recorded in the storage medium 44 is stored in the internal memory of the MPU 48. The auxiliary lamp driver 50 is controlled to light the auxiliary lamp 22. Then, the timing generator 34 is controlled such that the subject is photographed by the photographing circuit 30. The image signal obtained by photographing the subject by the photographing circuit 30 is converted into digital data by the A/D converter 32, and the digital image data is stored in the RAM 36. The signal processor 38 is controlled such that the image data stored in the RAM 36 is stored in the VRAM 42, and via the liquid crystal driver 40, an image based on the image data is displayed on the liquid crystal cell 16. Thus, in this way, the image which the user is about to photograph is displayed on the liquid crystal cell 16 in real time.

Thereafter, when the release switch 24 is turned on, the signal processor 38 is controlled, and the image data stored in the RAM 36 is stored in the storage medium 44 in a compressed state (i.e., the subject is photographed).

Next, a playback processing routine, which is executed by the MPU 48 when the mode is switched over to the playback mode by the mode switching switch 26, will be described with reference to the flowchart shown in FIG. 3. The present playback processing routine corresponds to the control of the control device in the present invention. Due to the semi-transparent film 18, a portion of the light incident from the front surface of the liquid crystal cell 16 is reflected and a portion of the light from the light guiding path 20 passes through. The liquid crystal display device is structured such that a displayed image can be confirmed regardless of whether there is auxiliary light or not. When there is little auxiliary light, the amount of light passing through the liquid crystal cell is low, and it is difficult to confirm the image. In light of this fact, light from the auxiliary lamp 22 is illuminated onto the liquid crystal cell 16. However, if the auxiliary lamp 22 is always lit, much power is consumed. Thus, the present playback processing routine prevents such a drawback.

Figure 3:
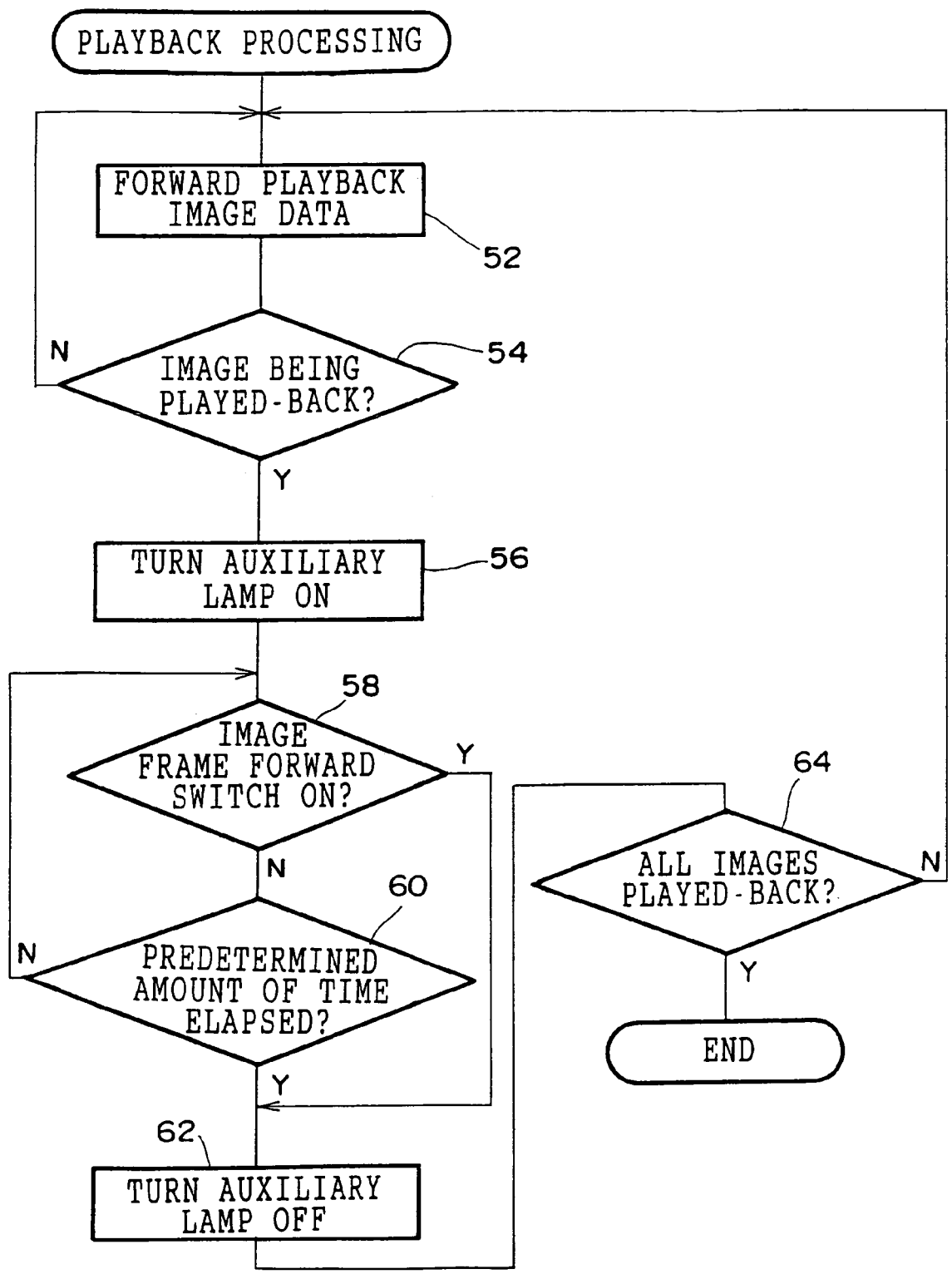
FIG. 3 is a flowchart illustrating a playback processing routine of the digital camera relating to the present embodiment.

In step 52 of FIG. 3, the playback image data is forwarded. Namely, the signal processor 38 is controlled such that the image data is read from the storage medium 44, and is temporarily stored in the RAM 36. The image data stored in the RAM 36 is read, is subjected to decompression processing, and is stored in the VRAM 42. Then, the liquid crystal driver 40 is driven, and an image is displayed on the liquid crystal cell 16 on the basis of the image data stored in the VRAM 42. When the liquid crystal driver 40 displays the image on the liquid crystal cell 16 on the basis of the image data, a completion signal is inputted to the MPU 48. The MPU 48 can thereby determine whether an image is displayed on the liquid crystal cell 16 on the basis of the image data, i.e., can determine whether an image is being played-back on the basis of the image data recorded in the storage medium 44. In other words, in step 54, by determining whether input of the completion signal does or does not exist, it is determined whether or not an image is being played-back on the basis of the image data recorded in the storage medium 44. When it is determined that an image is being played-back, the auxiliary lamp driver 50 is controlled such that the auxiliary lamp 22 is lit. Because the auxiliary lamp is lit, even if the amount of exterior light is low, the displayed image can easily be confirmed. When an image is displayed on the liquid crystal cell 16 on the basis of the image data, the auxiliary lamp 22 is lit. Namely, the auxiliary lamp 22 is not lit during processing for displaying the image on the liquid crystal cell 16 on the basis of the image data, before the image is completely displayed on the liquid crystal cell 16. Thus, the auxiliary lamp 22 can be prevented from being lit unnecessarily, and the amount of electric power used can be reduced.

In step 58, a determination is made as to whether the image frame forward switch 28 is on. When the image frame forward switch 28 is on, the routine proceeds to step 62. When the image frame forward switch 28 is off, in step 60, a determination is made as to whether a predetermined amount of time has elapsed from the time the auxiliary lamp 22 was turned on (or from the time the playback image data was forwarded). If the predetermined amount of time has not elapsed, the routine returns to step 58. If the predetermined amount of time has elapsed, i.e., if the image frame forward switch 28 has been off for a predetermined amount of time from the time the auxiliary lamp 22 was turned on, in step 62, the auxiliary lamp driver 50 is controlled to turn off the auxiliary lamp 62. In this way, in a case in which no switching of the image is designated even after a predetermined amount of time has passed after the image has been confirmed, the auxiliary lamp is turned off. Therefore, unnecessary lighting of the auxiliary lamp can be prevented, and the amount of power used can be reduced. Further, in a case in which there is a designation to switch the image before the predetermined amount of time has elapsed, play-back processing is to be carried out thereafter, and thus, the auxiliary lamp is turned off. Namely, the auxiliary lamp 22 is turned off during the processing for displaying the image on the liquid crystal cell 16 on the basis of the image data after switching. Thus, unnecessary lighting of the auxiliary lamp 22 can be prevented, and the amount of power used can be reduced.

In subsequent step 64, a determination is made as to whether all of the image frames have been played back. If not all of the image frames have been played back, the routine returns to step 52, and the above-described processings (steps 52 through 64) are repeated. In this way, after the image is switched to and has been confirmed, if there is no further designation to switch the image even though a predetermined amount of time has elapsed, the auxiliary lamp is turned off. When all of the image frames have been played-back, the present routine ends.

As described above, in the present embodiment, after the image is switched to and has been confirmed, if there is no further designation to switch the image even though a predetermined amount of time has elapsed, the auxiliary lamp is turned off. Thus, unnecessary lighting of the auxiliary lamp can be prevented, and the amount of power used can be reduced. If switching of the image is designated, the auxiliary lamp is turned on, and therefore, even if there is little exterior light, the image which has been switched to can be easily confirmed.

In the above embodiment, a description is given by using as an example a digital camera which is structured such that the liquid crystal display device is a reflective type which allows a displayed image to be confirmed regardless of the existence of auxiliary light. However, the present invention is not limited to the same, and can also be applied to a digital camera which is structured such that the liquid crystal display device is a transmission type which allows a displayed image to be confirmed regardless of the existence of auxiliary light.

Figure 4B:
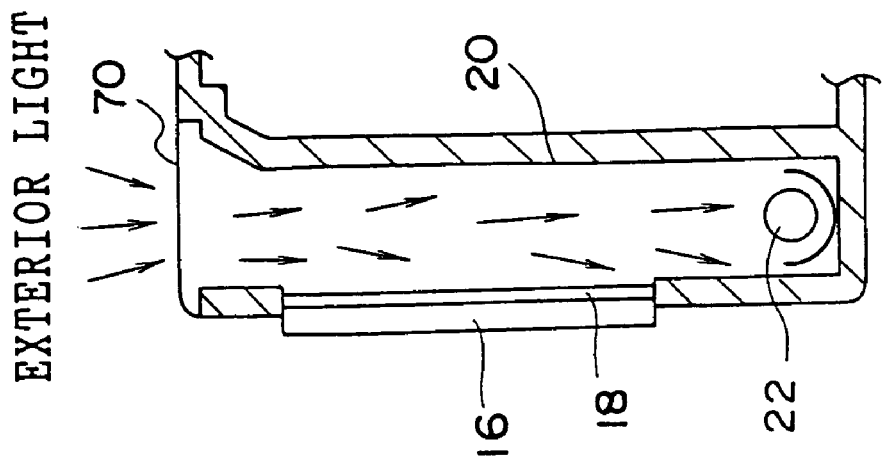
FIG. 4B is a schematic sectional view of the internal structure of the digital camera relating to the modified example.
Figure 4A:
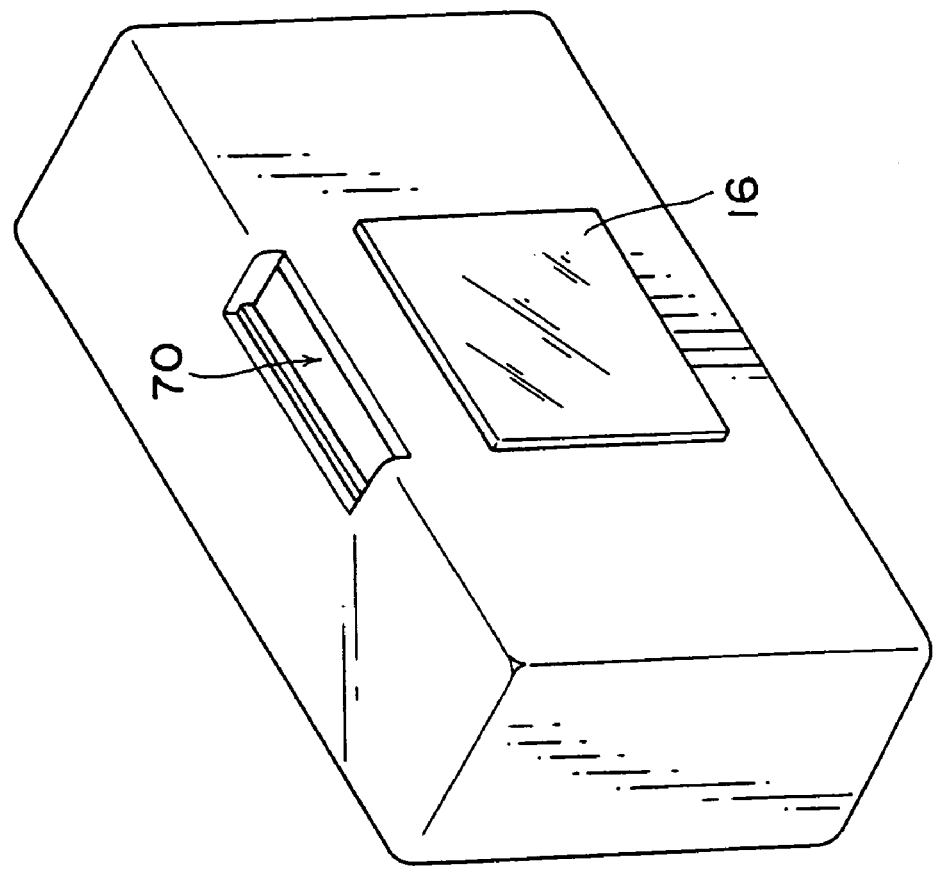
FIG. 4A is a rear perspective view of a digital camera relating to a modified example.

Namely, as illustrated in FIG. 4A, a digital camera having a transmission type liquid crystal display device is equipped with an light intake window 70. As illustrated in FIG. 4B, the light guiding path 20 is connected to the light intake window 70. In other words, the light which is taken-in via the light intake window 70 is guided to the reverse surface of the liquid crystal cell 16 by the light guiding path 20 and is transmitted (passes) through the liquid crystal cell 16. This digital camera as well may be provided with the previously-described semi-transparent film 18 so as to have a reflective function.

In the above-described embodiment, the predetermined amount of time, from after the image has been switched to and has been confirmed to the time the auxiliary lamp is turned off, is fixed. However, the present invention is not limited to the same, and a user can freely set the predetermined amount of time.

Figure 5:
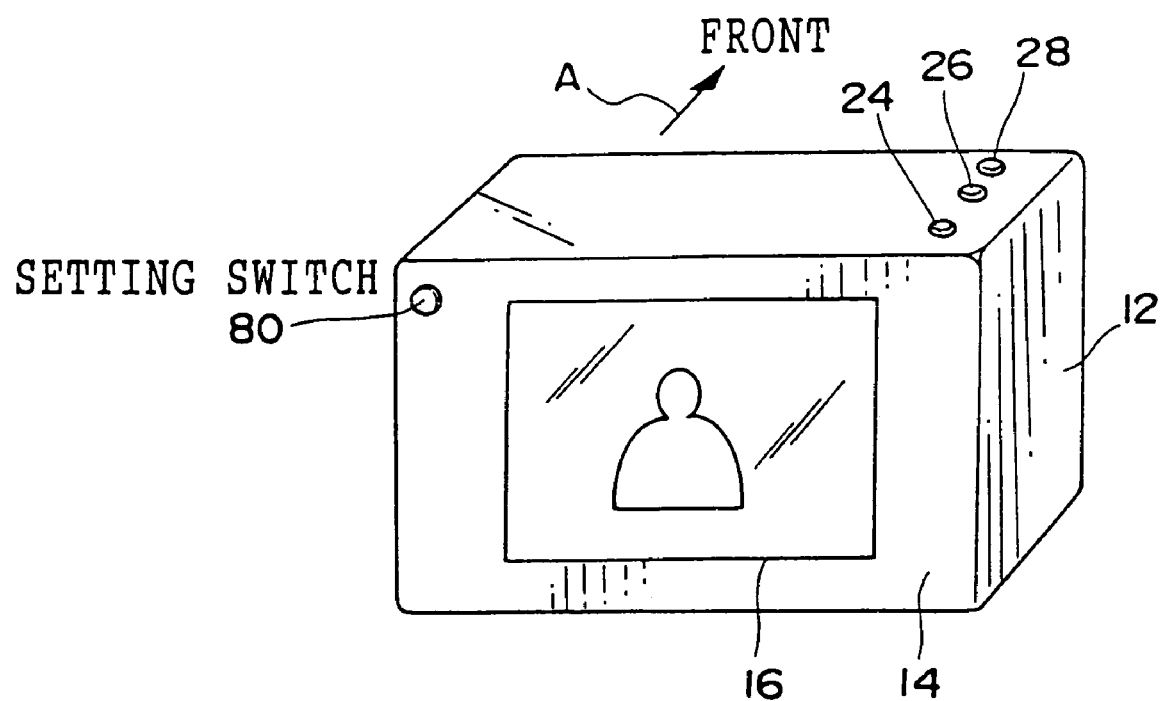
FIG. 5 is a rear perspective view of a digital camera relating to another modified example.

Namely, as illustrated in FIG. 5, a setting switch 80 for setting time may be provided. When the setting switch 80 is turned on, the predetermined amount of time, from after the displayed image has been switched and the newly-displayed image has been confirmed to the time the auxiliary lamp is turned off, is set to zero. In this state, when the setting switch 80 is turned on again, the time returns to the initial state. In this way, by the user operating the setting switch, the predetermined amount of time can be set to a time corresponding to the operations of the user, and thus, the predetermined amount of time can be made to correspond to the user's preferences. In particular, when it is determined that there is no need whatsoever to turn the auxiliary lamp on, if the setting switch 80 is turned on and the predetermined amount of time is set to zero, the auxiliary lamp will not be turned on. Further, a specific time may be inputted and set as the predetermined amount of time. For example 60 (seconds) or the like may be inputted so that the auxiliary lamp can be kept on for a while.

In the above-described embodiments, light from the auxiliary lamp is illuminated onto the liquid crystal cell via the light guiding path. However, the present invention is not limited to the same. The auxiliary lamp may be provided at the reverse surface of the liquid crystal cell, and the reverse surface of the liquid crystal cell may be illuminated directly by light from the auxiliary lamp or by light from the auxiliary lamp which has been diffused by a diffusion plate.

In the above embodiments, examples have been described in which the present image display device is applied to a digital camera. However, the present invention is not limited to the same, and the present image display device may be applied to a video camera or the like.

As described above, in the present embodiment, if there is no further designation to switch the image even after a predetermined amount of time has passed from the time the image was switched to or the time the auxiliary lamp was turned on, the auxiliary lamp is turned off. Thus, the amount of electric power used can be reduced, and the image can be easily confirmed.

What is claimed is:

1. An image display device, comprising:
   a display which displays an image on the basis of image data and which switches from display of one image to display of another image, the display being structured such that an image displayed thereon can be confirmed regardless of the existence of auxiliary light;
   an auxiliary lamp which illuminates the auxiliary light onto the display;
   a designating device for designating switching of an image;
   a control device for, in a case in which the designating device designates switching of an image, turning off the auxiliary lamp and controlling the display such that a displayed image is switched to another image which is then displayed and turning on the auxiliary lamp, and in a case in which the designating device does not further designate switching of the image even after a predetermined amount of time has elapsed from the time the image was switched to or from the time the auxiliary lamp was lit, the control device turns off the auxiliary lamp; and
   setting means for setting the predetermined amount of time, wherein the setting means can set the predetermined amount of time to be zero.

2. The image display device according to claim 1, wherein in the case in which the designating device designates switching of an image, the control device turns the auxiliary lamp on when the image to be switched to can be displayed on the display.

3. The image display device according to claim 1, wherein said display includes:
   an image display portion which displays an image;
   a light guiding path which guides the auxiliary light from the auxiliary lamp to the image display portion; and
   a semi-transparent film which is disposed between the image display portion and the light guiding path, and which reflects a portion of the light which is incident through the image display portion.

4. The image display device according to claim 1, wherein said display includes:
   an image display portion which displays an image;
   a light guiding path which guides the auxiliary light from the auxiliary lamp to the image display portion; and
   a light intake means which is connected to the light guiding path, takes in exterior light, and guides the taken-in light to the light guiding path.

5. An image display method for an image display device, wherein the display device comprises a display which displays an image on the basis of image data and which switches from display of one image to display of another image, the display being structured such that an image displayed thereon can be confirmed regardless of the existence of auxiliary light, an auxiliary lamp which illuminates the auxiliary light onto the display, and a designating device for designating switching of an image, said image display method comprising the steps of:
   turning off the auxiliary lamp and controlling the display device such that a displayed image is switched to another image which is then displayed, and turning on the auxiliary lamp in a case in which the designating device designates switching of an image; and
   turning off the auxiliary lamp in a case in which the designating device does not further designate switching of the image even after a predetermined amount of time has elapsed from the time the image was switched to or from the time the auxiliary lamp was lit, wherein the predetermined amount of time can be zero.

6. A digital camera, comprising:
   photographing means for photographing a subject; and
   an image display device for displaying an image on the basis of image data obtained by photographing the subject by the photographing means, wherein the image display device comprises:
   a display which displays an image on the basis of image data and which switches from display of one image to display of another image, the display being structured such that an image displayed thereon can be confirmed regardless of the existence of auxiliary light;
   an auxiliary lamp which illuminates the auxiliary light onto the display;
   a designating device for designating switching of an image;
   a control device for, in a case in which the designating device designates switching of an image, turning off the auxiliary lamp and controlling the display such that a displayed image is switched to another image which is then displayed and turning on the auxiliary lamp, and in a case in which the designating device does not further designate switching of the image even after a predetermined amount of time has elapsed from the time the image was switched to or from the time the auxiliary lamp was lit, the control device turns off the auxiliary lamp; and
   setting means for setting the predetermined amount of time, wherein the setting means can set the predetermined amount of time to be zero.

7. The digital camera according to claim 6, wherein in a case in which the designating device designates switching of an image, the control device turns the auxiliary lamp on when the image to be switched to can be displayed on the display.

8. The digital camera according to claim 6, wherein said display includes:
   an image display portion which displays an image;
   a light guiding path which guides the auxiliary light from the auxiliary lamp to the image display portion; and a semi-transparent film which is disposed between the image display portion and the light guiding path, and which reflects a portion of the light which is incident through the image display portion.

9. The digital camera according to claim 6, wherein said display includes:
an image display portion which displays an image;
a light guiding path which guides the auxiliary light from the auxiliary lamp to the image display portion; and
a light intake means which is connected to the light guiding path, takes in exterior light, and guides the taken-in light to the light guiding path.

10. An image display device, comprising:
a control device structured to control functionalities of the image display device;
a display structured to display a first image based on instructions from the control device;
an auxiliary lamp structured to illuminate auxiliary light onto the display based on instructions from the control device; and
a designating device structured to designate switching of image from the first image to a second image on the display, wherein
in case the designating device designates switching, the control device turns off the auxiliary lamp prior to the switching between the first and second images and turns on the auxiliary lamp after the switching, and
in case the designating device does not designate switching, the control device turns off the auxiliary lamp after a predetermined time has elapsed from a previous switching or from the time the auxiliary lamp was lit; and
setting means for setting the predetermined amount of time, wherein the setting means can set the predetermined amount of time to be zero.

11. The image display device according to claim 10, wherein the display is structured to display the image regardless of the existence of the auxiliary light.

12. The image display device according to claim 11, wherein the display comprises:
a liquid crystal cell on an exterior of the display;
a semi-transparent film adjacent to a back surface of the liquid crystal cell; and
a light guiding path structured to guide the auxiliary light from the auxiliary lamp through the semi-transparent film to the liquid crystal cell.

13. The image display device according to claim 12, wherein the semi-transparent film is structured to reflect at least a portion of light incident on a front surface of the liquid crystal cell and is structured to transmit at least a portion of the auxiliary light.

14. The image display device according to claim 12, further comprising a light intake window structured to allow ambient light into the image display device to be guided by the light guiding path, wherein the semi-transparent film is structured to transmit at least a portion of the auxiliary light and at least a portion of the ambient light.

15. The image display device according to claim 1, wherein said display includes:
an image display portion which displays an image;
a light guiding path which guides the auxiliary light from the auxiliary lamp to the image display portion; and
a semi-transparent film which is disposed between the image display portion and the light guiding path, and which reflects a portion of the light which is incident through the image display portion,
wherein the light which is incident through the image display portion is incident to the image display portion, from a display side, a part of the light being reflected by the semi-transparent film.

16. The image display device according to claim 1, wherein the control device turns on the auxiliary lamp when it is determined that a completion signal, which is transmitted at the time the image is displayed on the display device, is inputted thereto.

17. The image display method according to claim 5, further comprising:
guiding the auxiliary light from the auxiliary lamp to the image display portion utilizing a light guiding path; and
reflecting a portion of a light incident through an image display portion of the display utilizing a semi-transparent film disposed between the image display portion and the light guiding path,
wherein the light which is incident through the image display portion is incident to the image display portion, from a display side, a part of the light being reflected by the semi-transparent film.

18. The image display method according to claim 5, further comprising turning on the auxiliary lamp when it is determined that a completion signal, which is transmitted at the time the image is displayed on the display device, is inputted.

19. The digital camera according to claim 6, wherein said display of the image display device includes:
an image display portion which displays an image;
a light guiding path which guides the auxiliary light from the auxiliary lamp to the image display portion; and
a semi-transparent film which is disposed between the image display portion and the light guiding path, and which reflects a portion of the light which is incident through the image display portion,
wherein the light which is incident through the image display portion is incident to the image display portion, from a display side, a part of the light being reflected by the semi-transparent film.

20. The digital camera according to claim 6, wherein the control device of the image display device turns on the auxiliary lamp when it is determined that a completion signal, which is transmitted at the time the image is displayed on the display device, is inputted thereto.

21. The image display device according to claim 10, wherein said display includes:
an image display portion which displays an image;
a light guiding path which guides the auxiliary light from the auxiliary lamp to the image display portion; and
a semi-transparent film which is disposed between the image display portion and the light guiding path, and which reflects a portion of the light which is incident through the image display portion,
wherein the light which is incident through the image display portion is incident to the image display portion, from a display side, a part of the light being reflected by the semi-transparent film.

22. The image display device according to claim 10, wherein the control device turns on the auxiliary lamp when it is determined that a completion signal, which is transmitted at the time the image is displayed on the display device, is inputted thereto.

* * * * *